(12) United States Patent
Miyata (10) Patent No.: US 8,004,629 B2
(45) Date of Patent: Aug. 23, 2011

(54) LIQUID CRYSTAL MODULE, AUDIO FUNCTION-EQUIPPED LIQUID CRYSTAL MODULE, MOBILE COMMUNICATION DEVICE, AND MOBILE INFORMATION PROCESSING DEVICE

(75) Inventor: Kazuhiko Miyata, Habikino (JP)

(73) Assignee: Sharp Kabushiki Kaisha, Osaka (JP)

( * ) Notice: Subject to any disclaimer, the term of this patent is extended or adjusted under 35 U.S.C. 154(b) by 642 days.

(21) Appl. No.: 12/095,182

(22) PCT Filed: Jul. 26, 2006

(86) PCT No.: PCT/JP2006/314778
§ 371 (c)(1),
(2), (4) Date: May 28, 2008

(87) PCT Pub. No.: WO2007/063626
PCT Pub. Date: Jun. 7, 2007

(65) Prior Publication Data
US 2009/0244410 A1    Oct. 1, 2009

(30) Foreign Application Priority Data
Nov. 30, 2005  (JP) .................................. 2005-347040

(51) Int. Cl.
*G02F 1/1335* (2006.01)
(52) U.S. Cl. .......................................................... 349/58
(58) Field of Classification Search .................... 349/58; 455/575.1
See application file for complete search history.

(56) References Cited

U.S. PATENT DOCUMENTS

| | | | |
|---|---|---|---|
| 6,342,831 B1 | 1/2002 | Azima | |
| 6,427,017 B1 | 7/2002 | Toki | |
| 2001/0026625 A1 | 10/2001 | Azima et al. | |
| 2002/0081981 A1 | 6/2002 | Lee | |
| 2003/0003879 A1* | 1/2003 | Saiki et al. ...................... 455/90 |
| 2005/0002537 A1 | 1/2005 | Azima et al. | |
| 2005/0129267 A1 | 6/2005 | Azima et al. | |
| 2006/0166698 A1 | 7/2006 | Saiki et al. | |

FOREIGN PATENT DOCUMENTS

| | | |
|---|---|---|
| EP | 1 084 592 B1 | 10/2003 |
| JP | 62-204228 A | 9/1987 |
| JP | 2002-218036 A | 8/2002 |
| JP | 2002-533957 A | 10/2002 |
| JP | 2003-179988 A | 6/2003 |
| JP | 2004-272059 A | 9/2004 |
| WO | 97/09852 A2 | 3/1997 |
| WO | 00/02417 A1 | 1/2000 |

OTHER PUBLICATIONS

Official communication issued in the International Application No. PCT/JP2006/314778, mailed on Oct. 24, 2006.

* cited by examiner

*Primary Examiner* — James Dudek
(74) *Attorney, Agent, or Firm* — Keating & Bennett, LLP (57) ABSTRACT

A liquid crystal module includes a liquid crystal panel and a support member configured to be contained in a mother device and to which the liquid crystal panel is mounted. A protection plate having protection function for the surface of the liquid crystal panel is attached to the support member, so that the protection plate, the liquid crystal panel, and the support member are made into a unitary block. Thus, it is possible to configure a liquid crystal module such that the protection plate has an additional function other than the protection of the liquid crystal panel.

28 Claims, 7 Drawing Sheets

LIQUID CRYSTAL MODULE, AUDIO FUNCTION-EQUIPPED LIQUID CRYSTAL MODULE, MOBILE COMMUNICATION DEVICE, AND MOBILE INFORMATION PROCESSING DEVICE

BACKGROUND OF THE INVENTION

1. Field of the Invention

The present invention relates to a liquid crystal display device in which a protection plate in a liquid crystal panel has an additional function.

2. Description of the Related Art

Generally, a liquid crystal display device includes a backlight (a backlight carrier including a backlight), a reflective plate, a light guide plate (a light guide), a diffusing plate, a liquid crystal panel, and a protection plate for protecting the liquid crystal panel. The backlight, the reflective plate, the light guide plate, the diffusing plate, and the liquid crystal panel are provided in a support frame such that the backlight is placed on a backside and the liquid crystal panel is placed on an upper side, so as to form a liquid crystal module (a conventional liquid crystal module). Then, the liquid crystal module is attached to a mother device, and the protection plate is attached thereto so as to cover its upper side (a surface of the liquid crystal panel). The liquid crystal display device is arranged as such. For example, in a mobile phone including a liquid crystal display device, a liquid crystal module is placed in a mother device of the mobile phone, and a protection plate for protecting a surface of the liquid crystal panel is attached to the mother device. In this way, the conventional liquid crystal display device is arranged such that the liquid crystal module including the liquid crystal panel and the protection plate for protecting the surface of the liquid crystal panel are, so to speak, provided separately from each other and respectively attached to the mother device.

The protection plate is a necessary member for a liquid crystal display device in order to protect a liquid crystal panel from an external force. Meanwhile, in recent years, it has been proposed to add an additional function other than the protection function to the protection plate. For example, a specific phase characteristic is added to the protection plate so that contents displayed in the liquid crystal panel become invisible or unable to be peeked at from the side so to a provide a viewing angle control function, and a protection plate is resonated so as to output sound so as to provide an audio function. See, for example, Japanese Translation of PCT International Application, *Tokuhyohei*, No. 11-512253, and Japanese Unexamined Patent Publication, Tokukai, No. 2000-152385.

In such a case where the protection plate has an additional function other than a protection function for the liquid crystal panel, and as a result, the liquid crystal panel becomes closely related to the protection plate, the conventional arrangement in which the liquid crystal module and the protection plate are separately provided causes a problem that the additional function is insufficiently realized.

More specifically, it is required to perform alignment to the liquid crystal panel and the protection plate in regard to the viewing angle control, and it is required to set an acoustic characteristic according to an arrangement of the liquid crystal module including the liquid crystal panel in regard to the audio function. However, in the conventional arrangement in which the liquid crystal module and the protection plate are respectively attached to the mother device, such alignment and setting cannot be appropriately performed.

SUMMARY OF THE INVENTION

In order to overcome the problems described above, preferred embodiments of the present invention provide a liquid crystal module which is suitable for a protection plate to have an additional function, other than a protection function for a liquid crystal panel.

A liquid crystal module according to a preferred embodiment of the present invention is arranged such that a protection plate having a protection function for protecting a surface of a liquid crystal panel is integrated with the liquid crystal module. In the arrangement, since the protection plate is integrated with the module including the liquid crystal panel, when an additional function (for example, an audio function) is added to the protection plate, it is possible to optimize a setting in accordance with the additional function in advance, for example, in a module manufacturing stage. This makes it possible to appropriately and conveniently provide or add an intended additional function without being largely influenced by a design condition of a mother device.

The liquid crystal module includes a support member capable of being placed in a mother device, for example, a housing of a mother device, the protection plate and the liquid crystal panel being attached to the support member so that the protection plate, the liquid crystal panel, and the support member are integrated together.

The liquid crystal module can be arranged such that the protection plate also has a viewing angle control function.

The liquid crystal module can be also arranged such that the protection plate also has an audio function, for example, a function as a speaker and a microphone. For example, the liquid crystal module may include a vibrating element, such as an exciter, wherein a closed space may be formed by the protection plate and the support member, the closed space containing the liquid crystal panel therein, and the protection plate works as a radiator and the support member works as an enclosure box. The arrangement makes it possible to optimize a setting of an acoustic characteristic or the like in advance, for example, in the module manufacturing stage, and to provide the liquid crystal module having a high audio function.

In this arrangement, it is preferable that an acoustic characteristic be set according to a module structure. In addition, it is preferable that the vibrating element be provided in the protection plate. This allows for an increase in the vibration efficiency of the protection plate.

Moreover, it is preferable that an air layer be provided between the protection plate and the liquid crystal panel. This improves the protection function because, even if the protection plate bends in response to an external force, the protection plate does not come into contact with the liquid crystal panel. In addition, this arrangement allows the air layer to work as a vibration space for the vibrating element.

Furthermore, it is preferable that a hole is provided to connect the air layer and the space formed in the support member. This can increase a space, such as an air layer, which comes into contact with the protection plate which works as a radiator, and increase vibration accuracy of the protection plate without increasing thickness of the module.

The liquid crystal module may be arranged such that the protection plate has a portion to be cut out in its edge section so that the protection plate is able to be shaped according to a display window of the mother device. Alternatively, the liquid crystal module may be capable of being provided with an attachment member which fits a display window of the mother device. In this case, the attachment member is to be attached to the edge section of the protection plate or the support member.

It is preferable that the liquid crystal module be mountable to the mother device by an edge of the protection plate or the attachment member, wherein the liquid crystal module is mountable to the mother device in such a manner that the support member does not come into contact with the mother device. This makes it possible to avoid, to the greatest extent, changes in an acoustic characteristic of the liquid crystal module, which are caused when the liquid crystal module is attached to the mother device.

It is preferable that the liquid crystal module include a wire bundle for connection to an external component, the wire bundle being extended externally, wherein the wire bundle will be connected to a substrate provided in the mother device when the liquid crystal module is attached to the mother device. The liquid crystal module may be arranged such that an audio signal is wirelessly transmitted from the mother device to the liquid crystal module, or an audio signal and a display signal from the mother device are input in the liquid crystal module via the wire bundle. In this case, it is preferable that the audio signal and the display signal be input via one wire bundle. With this arrangement, just one bundle is connected to the mother device, and it is possible to avoid, to the greatest extent, changes in the acoustic characteristic of the liquid crystal module, which are caused when the liquid crystal module is attached to the mother device. Furthermore, this allows a connection process to be easier. From this point, it is further preferable that the one wire bundle include a power supply wiring such as a power supply wire for a backlight, or the like. In addition, it is convenient for handling the wire bundle that the wire bundle is provided in a flexible print circuit (FPC).

The liquid crystal module may be arranged such that the input audio signal is relayed via the liquid crystal panel. In this case, the liquid crystal module also can be arranged such that the audio signal relayed via the liquid crystal panel be transmitted to the vibrating element directly or via the wire bundle.

It is preferable that the liquid crystal module include an audio signal processing circuit for processing the audio signal. With the arrangement, it is not necessary that the audio signal processing circuit be provided in the mother device. As a result, this arrangement is convenient for designing and manufacturing companies of a mother device. In this case, the audio signal processing circuit may be provided in a flexible print circuit. Also, the audio signal processing circuit can be provided in a liquid crystal panel. This makes it possible to form whole or a part of the audio signal processing circuit in a liquid crystal panel manufacturing process. Moreover, it is preferable that the audio signal processing circuit be designed according to an acoustic characteristic of the module. Furthermore, an audio tone control circuit and an audio volume control circuit can be provided in the audio signal processing circuit. This makes it possible to correct a subtle performance change (audio quality change), which occurs when the liquid crystal module is integrated with the mother device. With this arrangement, an audio quality which is adjusted to be a standard can be more precisely adjusted according to purposes of each designer of a mother device. This arrangement is also convenient in that end users can adjust an audio quality and an audio volume according to their preference.

The liquid crystal module can be arranged such that at least a portion of the audio signal processing circuit is formed in a liquid crystal panel manufacturing process. Also, the liquid crystal module can be arranged such that at least a portion of a receiving circuit for receiving the audio signal which is wirelessly transmitted is formed in a liquid crystal panel manufacturing process. This allows for reductions in the manufacturing processes of the liquid crystal module and its manufacturing cost.

An audio or acoustic function-equipped liquid crystal module includes a liquid crystal panel, a protection plate having a protection function for protecting a surface of the liquid crystal module, a vibrating element for vibrating the protection plate, and a support member, wherein the protection plate and the liquid crystal panel are integrated via the support member so as to allow the protection plate to receive an acoustic vibration.

The audio function-equipped liquid crystal module can be arranged such that at least a portion of wirings and an audio signal processing circuit which are connected to the vibrating element are provided in the liquid crystal panel.

It is preferable that the audio function-equipped liquid crystal module be mountable to a mother device by an edge of the protection plate or an additional attachment member, wherein the audio function-equipped liquid crystal module is mountable to the mother device such that the support member does not come into contact with the mother device.

It is preferable that the audio function-equipped liquid crystal module include a wire bundle for connection to an external component, the wire bundle being extended externally, wherein the wire bundle will be connected to a substrate provided in the mother device when the audio function-equipped liquid crystal module is attached to the mother device.

Moreover, a mobile communication device according to a preferred embodiment of the present invention includes the liquid crystal module according to a preferred embodiment described above.

Furthermore, a mobile information processing device according to another preferred embodiment of the present invention includes the liquid crystal module according to a preferred embodiment described above.

As described above, the liquid crystal module according to a preferred embodiment of the present invention is arranged such that the protection plate is integrated together. As a result, when an additional function, for example, an audio function, is added to the protection plate, it is possible to optimize a setting in accordance with the additional function in advance, such as in a module manufacturing stage. For example, in a case where an audio function is added, a setting of an acoustic characteristic or the like can be optimized in advance, such as in the module manufacturing stage, thereby resulting in that a liquid crystal module having a high audio function can be provided.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention is described below with reference to FIGS. 1 through 9.

Figure 1:
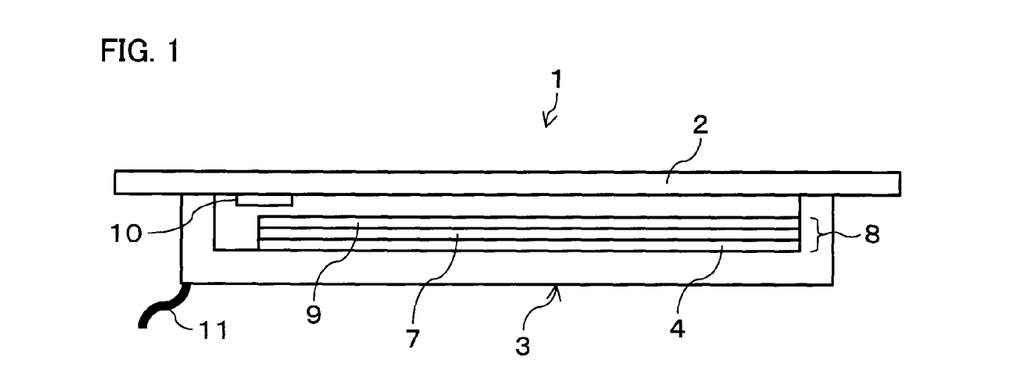
FIG. 1 is a cross sectional view illustrating an arrangement of a liquid crystal module in accordance with a preferred embodiment of the present invention.
Figure 2:
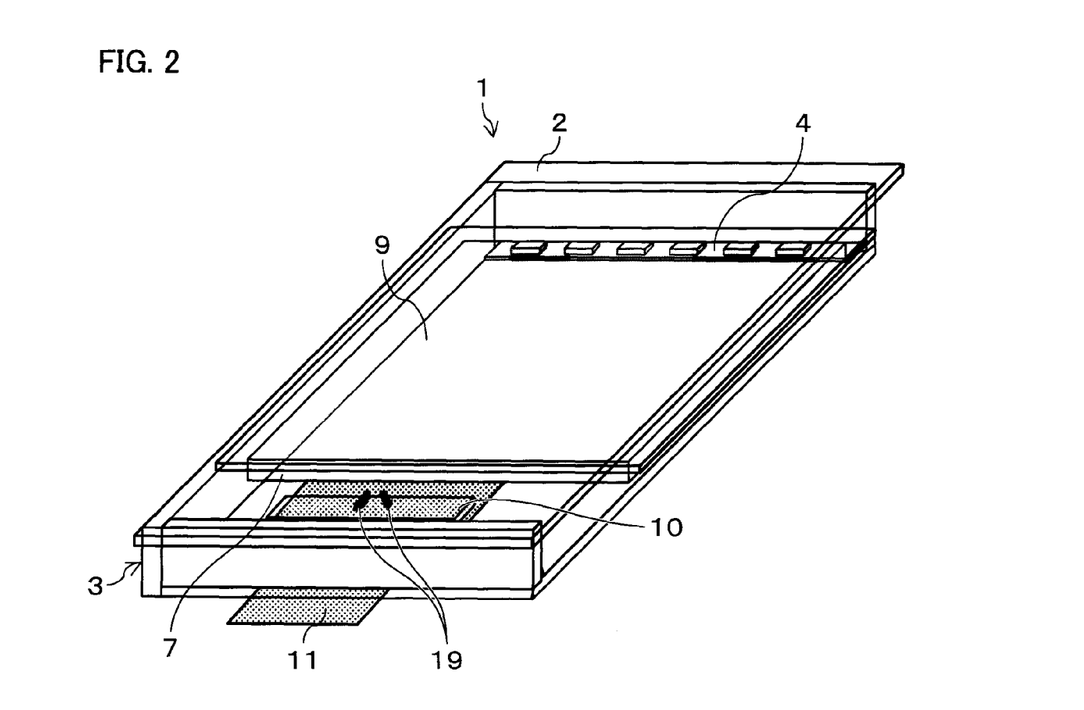
FIG. 2 is a perspective view illustrating the arrangement of the liquid crystal module in accordance with a preferred embodiment of the present invention.

FIG. 1 is a cross sectional view of a liquid crystal module according to a preferred embodiment, and FIG. 2 is a perspective view thereof. As illustrating in FIGS. 1 and 2, a liquid crystal module 1 has an integrated structure of a liquid crystal panel 9 and a cover panel 2 with a vibration source. In this integrated structure, the liquid crystal panel 9 and the cover panel 2 defining a protection plate and having a vibration source 10 are attached to a module housing 3 defining a support member. The liquid crystal module 1 has an audio function such as a sound or speaker function which makes a sound by vibration of the cover panel 2 and a sound collecting or microphone function, in addition to a display function of the liquid crystal panel 9. Here, since the liquid crystal module 1 has such an integrated structure of a liquid crystal display member 8 including the liquid crystal panel 9, the cover panel 2 with the vibration source, and the module housing 3, it is possible to optimize an acoustic characteristic in advance according to a module configuration. Consequently, this makes it possible to conveniently use the audio function or audio quality which is appropriately designed in advance and provided in a form in which its quality can be checked in advance. This allows manufacturers, for example, a designing and manufacturing company of a mother device of a mobile phone, to assemble a mother device without bothering its acoustic characteristic, while maintaining high audio quality, such that, manufacturers can freely design a mother device or the like. As such, this arrangement is very convenient. The following describes details of the liquid crystal module in accordance with the present preferred embodiment.

As illustrated in FIGS. 1 and 2, a liquid crystal module 1 includes a module housing 3 defining a carrier frame, a cover panel 2, a vibration source 10 defining a vibrating element, a liquid crystal display member 8 that preferably includes a liquid crystal panel 9, an optical sheet 7, and a backlight module 4, and an FPC or flexible print circuit 11. The optical sheet 7 includes a diffusing plate and the like, and the backlight module 4 includes an LED or light-emitting diode, an LED driving circuit, a light guide plate defining a light guide, a reflective plate, and the like.

Each member in the liquid crystal display member 8 (e.g., the liquid crystal panel 9, the optical sheet 7, and the backlight module 4) preferably is constructed to be one size smaller than a bottom of the module housing 3. The backlight module 4, the optical sheet 7, and the liquid crystal panel 9 are attached, in this order from the bottom, to the module housing 3, and the cover panel 2 is further attached thereto so as to cover a display surface of the liquid crystal panel 9, so as to cover the module housing 3. The cover panel 2 and the liquid crystal panel 9 face each other with a certain gap therebetween, and the vibration source 10 is provided on a backside of the cover panel 2, on a side of the liquid crystal panel 9. Since an area of the cover panel 2 is larger than that of the liquid crystal panel 9, the cover panel 2 has a portion which does not face the liquid crystal panel 9. The vibration source 10 is preferably provided at this portion. The vibration source 10 is connected to the FPC 11 via a wiring 19 in the module (see FIG. 2).

The cover panel 2 is a transparent plate with or without color, and has a function to output sound when the cover panel 2 is resonated by the vibration source 10, in addition to a function to protect a surface of the liquid crystal panel 9. As the vibration source 10, a piezoelectric element, which is made of a crystal, a Rochelle salt crystal, or a ceramic thin plate, can be used. It is preferable that the vibration source 10 be provided in the cover panel 2, but the vibration source 10 can be also provided in a member other than the cover panel 2. Moreover, the cover panel 2 may have a viewing angle control function or peek prevention function.

Furthermore, the liquid crystal panel 9 is connected to a video driver (not illustrated) which drives the liquid crystal panel 9, and the vibration source 10 is connected to an audio driver (not illustrated) which drives the vibration source 10. The video driver and the audio driver may be provided separately from the liquid crystal panel 9, or may be monolithically provided in the liquid crystal panel 9. Each of the drivers is connected to the FPC 11.

In this way, in the liquid crystal module 1, a closed space is formed by the module housing 3 and the cover panel 2, and the liquid crystal display member 8 (the liquid crystal panel 9, the optical sheet 7, and the backlight module 4) and the vibration source 10 are placed in the closed space. On this account, when the audio function is carried out, the vibration source 10 works as an exciter, the cover panel 2 works as a radiator, and the module housing 3 works as an enclosure. A space between the cover panel and the liquid crystal panel 9 works as a background cavity for acoustic vibration of the cover panel 2. The space between the cover panel 2 and the liquid crystal panel 9 is arranged such that, while a thickness of the module is restrained, the cover panel 2 can have both of the radiator function and the protection function for the surface of the liquid crystal panel. More specifically, the space is arranged such that, even when the cover panel 2 bends according to an external force, the liquid crystal panel 9 is not damaged by its bending, and a width of the space is as small as possible while still allowing the cover panel 2 to vibrate (for example, about 1 mm to about 2 mm). It is preferable that a space between the module housing 3 and the liquid crystal display member 8 placed therein be connected to the aforementioned space between the cover panel 2 and the liquid crystal panel via a hole or the like. This makes it possible to increase a space (normally, an air layer) coming into contact with the cover panel 2 which works as a radiator, and to heighten vibration accuracy of the cover panel 2 without increasing thickness of the module.

Figure 3:
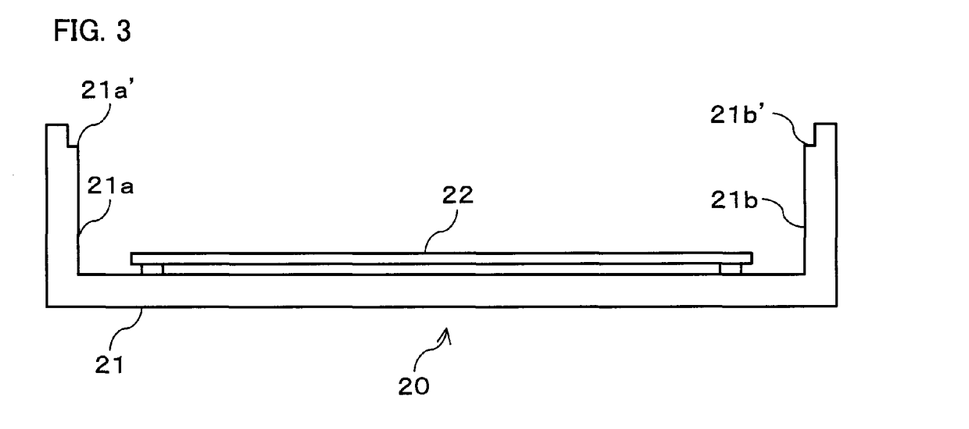
FIG. 3 is a cross sectional view illustrating an arrangement of a mother device in which the liquid crystal module is to be placed.
Figure 4:
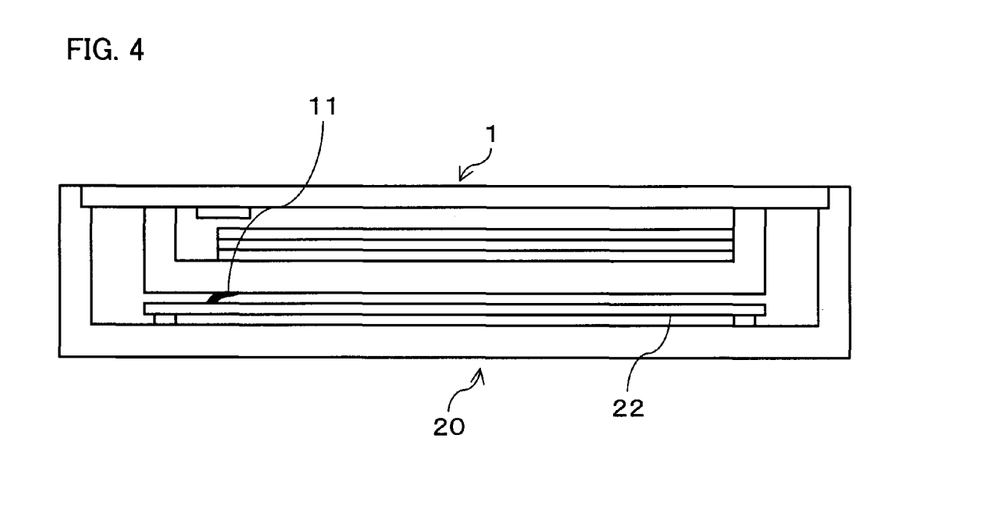
FIG. 4 is a cross sectional view illustrating an arrangement of a mother device in which the liquid crystal module is placed.

FIG. 3 is a cross sectional view illustrating a mother device in which the liquid crystal module is to be placed, and FIG. 4 is a cross sectional view illustrating a mother device in which the liquid crystal module is placed. As illustrated in FIG. 3, a mother device 20 includes a housing 21, and a motherboard 22 which is attached to the housing 21. Here, support sections 21$a'$ and 21$b'$ are provided respectively inside top edges of standing sections 21$a$ and 21$b$ of the housing 21, and the liquid crystal module 1 is attached to the mother device 20 such that a peripheral edge section of the cover panel 2 is placed on the support sections 21$a'$ and 21$b'$ and bonded thereto (for example, by a double-stick tape) (see FIG. 4). If the liquid crystal module 1 is attached to the mother device 20 in such a way, then it is possible to avoid, to the greatest extent, changes in the acoustic characteristic of the liquid crystal module 1, which are caused when the liquid crystal module 1 is attached to the mother device 20.

Figure 5:
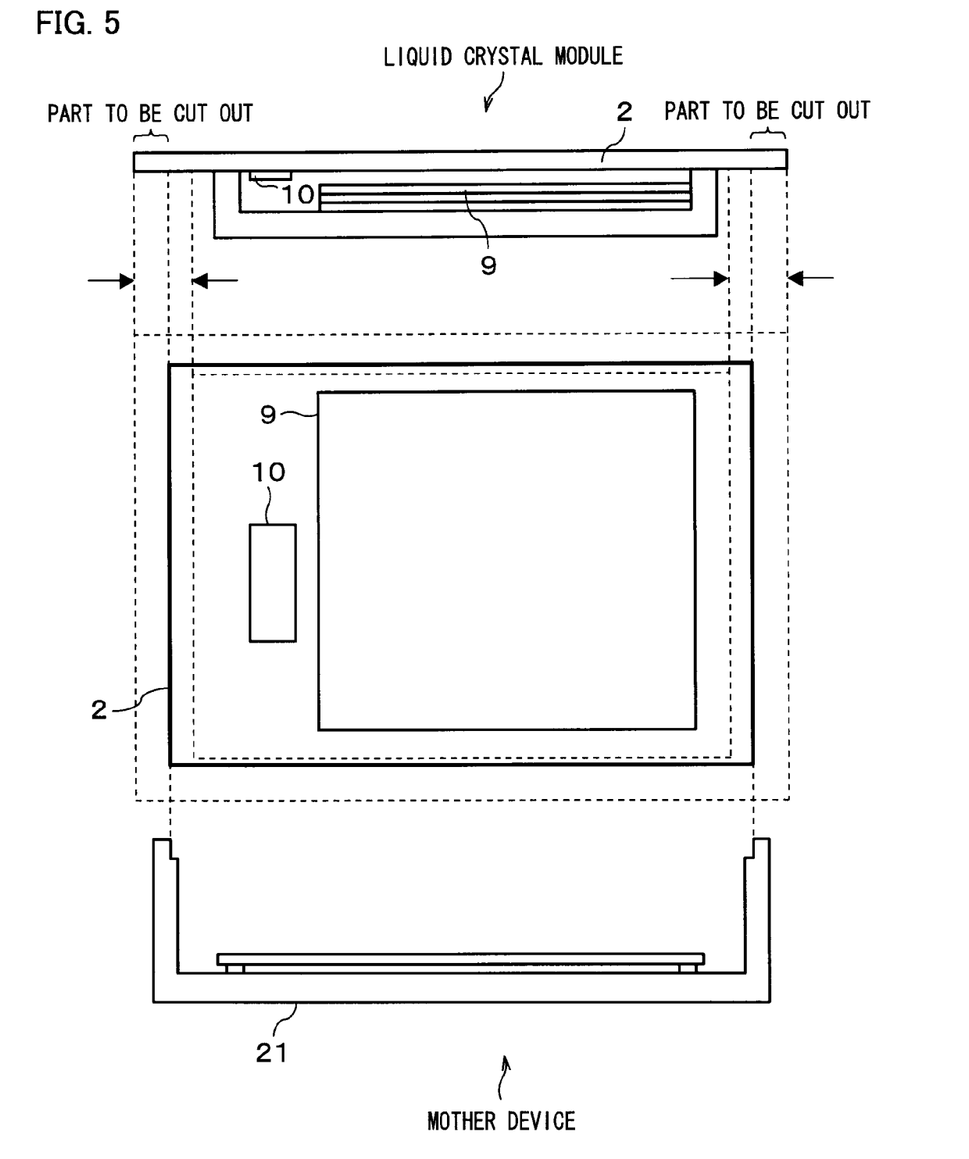
FIG. 5 is an explanatory view illustrating an arrangement of the liquid crystal module in accordance with a preferred embodiment of the present invention.

In the case where the liquid crystal module 1 is attached to the mother device 20 by the peripheral edge section of the cover panel 2, it is preferable that the cover panel 2 be formed in such a manner that a design region is provided thereto in addition to a standard width of the housing 21 (see arrows in FIG. 5). In this arrangement, an unnecessary portion of the peripheral edge section of the cover panel 2 is cut out (see FIG. 5), so that the liquid crystal module 1 can be applied to various mother devices having different designs. Such an arrangement is convenient for manufacturers because a mother device can be more freely designed. Furthermore, the liquid crystal module 1 can be arranged such that the cover panel 2 is designed to have a minimum area, and an extension plate (attachment member used for attachment to a mother device) is attached to its periphery (peripheral edge section) so as to fit a design of a mother device. The liquid crystal module 1 arranged as such can be also applied to various mother devices having different designs. In this case, the attachment member may be attached to an edge section of the cover panel 2 or the module housing 3.

As illustrated in FIG. 4, the motherboard 22 of the mother device 20 is connected to the liquid crystal module 1 via a FPC 11. It is preferable that the FPC 11 include a video connection wiring, an audio connection wiring, a power supply wiring, and the like wirings all together. With the arrangement, just one FPC is connected to the motherboard 22, and it is possible to avoid, to the greatest extent, changes in the acoustic characteristics of the liquid crystal module 1, which are caused when the liquid crystal module 1 is attached to the mother device 20. Furthermore, this allows its connection process to be easier. It is also possible that a plurality of the FPCs 11 be provided so that the video connection wiring, the audio connection wiring, the power supply wiring, and the like wirings are independently provided. The process for connecting the motherboard 22 to the liquid crystal module 1 is described later.

Figure 6:
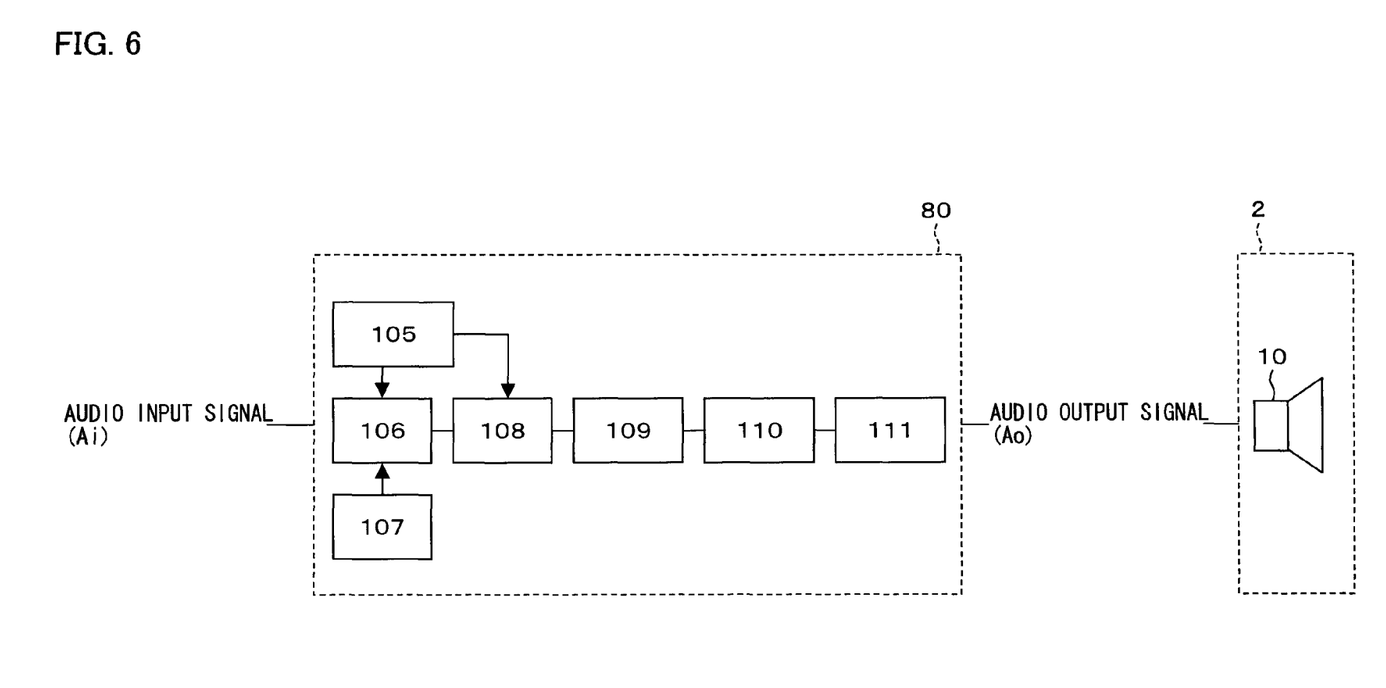
FIG. 6 is a block view illustrating an audio processing system in accordance with a preferred embodiment of the present invention.

FIG. 6 is a block view illustrating a process example of an audio input signal (Ai) in accordance with the present preferred embodiment. As illustrated in the figure, an audio driver 80 generates an audio output signal Ao from an audio input signal Ai, and supplies the audio output signal Ao to the vibration source 10 which is provided in the cover panel 2. The audio driver 80 includes a L/R channel synchronizer 105, a PCM sound data processing circuit 106, a data clock controller 107, a DAC 108, an equalizer/compressor circuit 109, a volume control circuit 110, and a power amplifier 111. An audio input signal Ai is input in the L/R channel synchronizer 105, the PCM sound data processing circuit 106, and the data clock controller 107. The PCM sound data processing circuit 106 carries out a process to the audio input signal Ai according to a control signal or instruction from the L/R channel synchronizer 105 and the data clock controller 107. An output signal such as digital data from the PCM sound data processing circuit 106 is converted into an analog signal or analog data by the DAC 108 which receives a control signal or instruction from the L/R channel synchronizer 105. An adjustment and an amplifying process, such as a sound quality adjustment, are performed on the analog signal in the equalizer/compressor circuit 109, the volume control circuit 110, and the power amplifier 111, and the analog signal is supplied to the vibration source 10 as an audio output signal Ao.

In this way, if the equalizer/compressor circuit 109 and the volume control circuit 110 are provided, then manufacturers and end users can change sound quality, sound volume or the like according to their preference. Thus, the arrangement is very convenient.

Figure 7A:
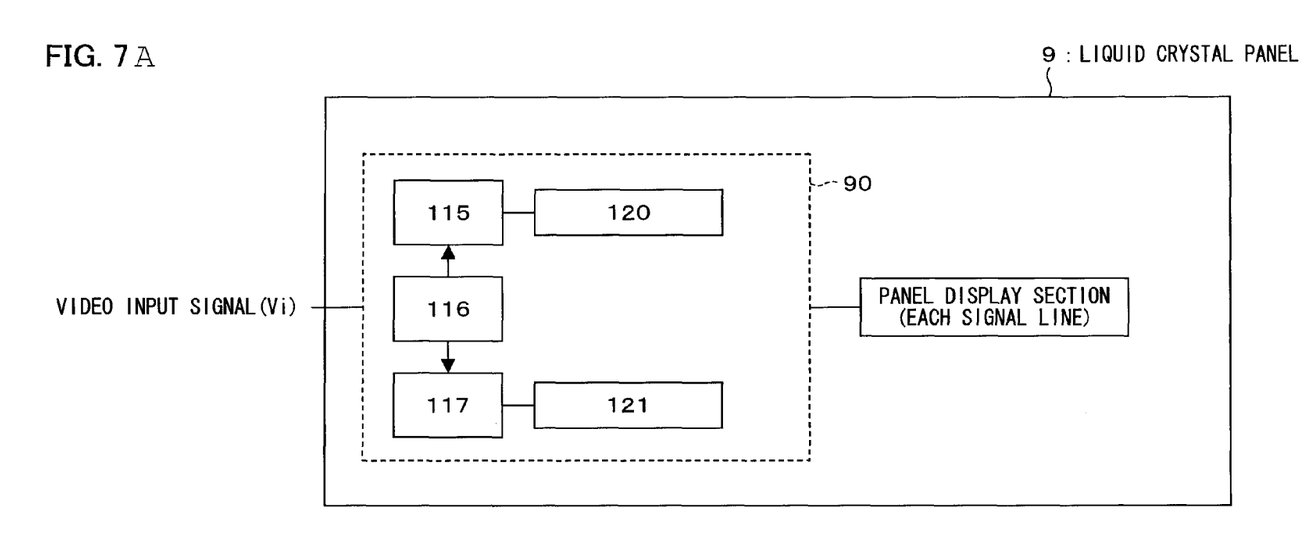
FIG. 7A is a block view illustrating a video processing system in accordance with a preferred embodiment of the present invention.
Figure 7B:
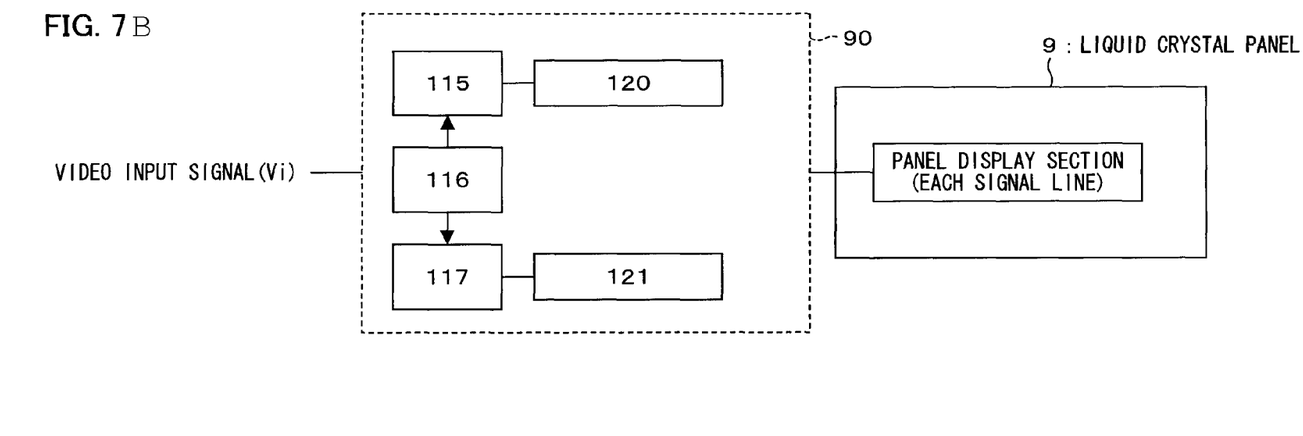
FIG. 7B is a block view illustrating a video processing system in accordance with a preferred embodiment of the present invention.

Furthermore, FIGS. 7A and 7B are block views illustrating process examples of a video input signal (Vi) in accordance with the present preferred embodiment. As illustrated in FIGS. 7A and 7B, a video driver 90 drives a display section (each signal line) in the liquid crystal panel 9 by using a video input signal Vi. The video driver 90 includes a vertical synchronizer 115, a timing controller 116, a scanning generator 117, a gate driver 120, and a source driver 121. A video input signal Vi is input in the vertical synchronizer 115, the timing controller 116, and the scanning generator 117. When receiving the signal, the timing controller 116 controls the vertical synchronizer 115 and the scanning generator 117. The gate driver 120 receives the signal from the vertical synchronizer 115 and drives a gate signal line in the panel display section, while the source driver 121 receives the signal from the scanning generator 117 and drives a source signal line in the panel display section. The video driver 90 may be monolithically provided in the liquid crystal panel 9 as illustrated in FIG. 7A, or may be provided separately from the liquid crystal panel 9 as illustrated in FIG. 7B.

FIGS. 8A through 8H illustrate examples of how to connect an audio input signal source and a video input signal source in a motherboard to a liquid crystal module, including a vibration source and a liquid crystal panel.

Figure 8A:
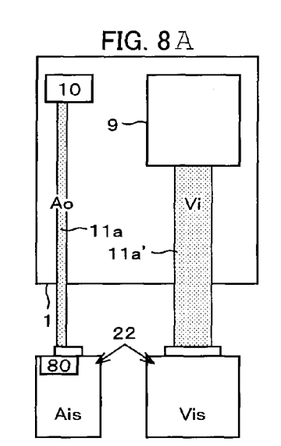
FIG. 8A is a view schematically illustrating an example arrangement of a connection of the liquid crystal module to a motherboard.

In an arrangement of FIG. 8A, an audio input signal source (Ais), an audio driver 80 connected thereto, and a video input signal source (Vis) are provided in a motherboard 22. While a vibration source 10 is connected to an FPC 11$a$, a liquid crystal panel 9 is connected to an FPC 11$a'$. Connectors of the FPC 11$a$ and the FPC 11$a'$ are connected to the motherboard 22.

Figure 8B:
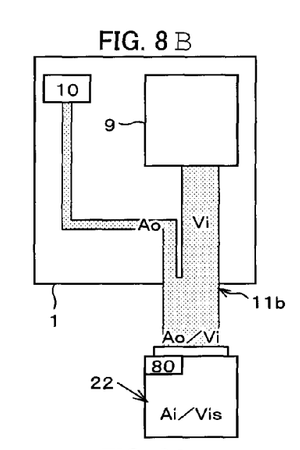
FIG. 8B is a view schematically illustrating another example arrangement of a connection of the liquid crystal module to a motherboard.

In an arrangement of FIG. 8B, an audio/video input signal source (Ai/Vis) and an audio driver 80 connected thereto are provided in a motherboard 22, and a connector of a FPC 11$b$ which is connected to a vibration source 10 and a liquid crystal panel 9 is connected to the motherboard 22. In this arrangement, an audio output signal Ao is output from the FPC 11$b$ to the vibration source 10.

Figure 8C:
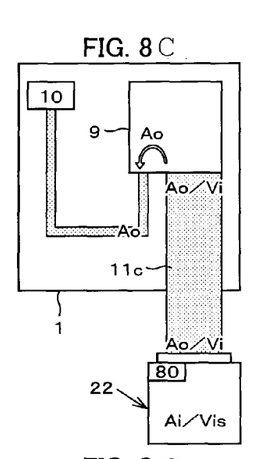
FIG. 8C is a view schematically illustrating another example arrangement of a connection of the liquid crystal module to a motherboard.

In an arrangement of FIG. 8C, an audio/video input signal source (Ai/Vis) and an audio driver 80 connected thereto are provided in a motherboard 22. While a vibration source 10 is connected to a liquid crystal panel 9 via an FPC, a connector of an FPC 11c connected to the liquid crystal panel 9 is connected to the motherboard 22. In the arrangement, an audio output signal Ao and a video input signal Vi are input in the liquid crystal panel 9, and the audio output signal Ao is output from the liquid crystal panel 9 to the vibration source 10.

Figure 8D:
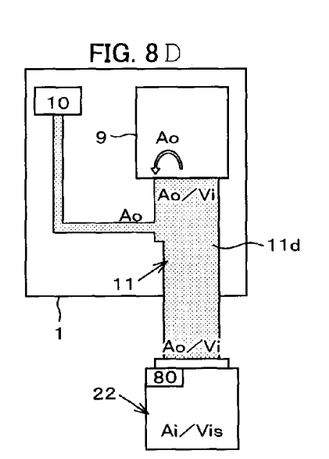
FIG. 8D is a view schematically illustrating another example arrangement of a connection of the liquid crystal module to a motherboard.

In an arrangement of FIG. 8D, an audio/video input signal source (Ai/Vis) and an audio driver 80 are provided in a motherboard 22, a vibration source 10 is connected to an FPC 11d connected to a liquid crystal panel 9, and a connector of the FPC 11d is connected to the motherboard 22. In the arrangement, an audio output signal Ao and a video input signal Vi are input in the liquid crystal panel 9, and the audio output signal Ao is output from the FPC 11d to the vibration source 10.

Figure 8E:
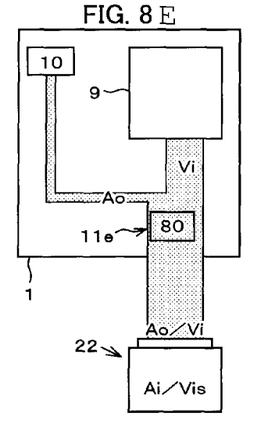
FIG. 8E is a view schematically illustrating another example arrangement of a connection of the liquid crystal module to a motherboard.

In an arrangement of FIG. 8E, an audio/video input signal source (Ai/Vis) is provided in a motherboard 22, and an audio driver 80 is provided in an FPC 11e connected to a vibration source 10 and a liquid crystal panel 9. A connector of the FPC 11e is connected to the motherboard 22. In this case, it is preferable that the audio driver 80 be provided in a portion of the FPC 11e, which portion is placed in a liquid crystal module 1.

Figure 8F:
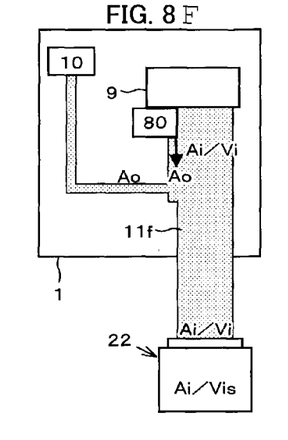
FIG. 8F is a view schematically illustrating another example arrangement of a connection of the liquid crystal module to a motherboard.

In an arrangement of FIG. 8F, an audio/video input signal source (Ai/Vis) is provided in a motherboard 22, and an audio driver 80 is provided in a liquid crystal module 1 (adjacent to a liquid crystal panel 9). A vibration source 10 is connected to an FPC 11f which is connected to the liquid crystal panel 9 and the audio driver 80, and a connector of the FPC 11f is connected to the motherboard 22.

Figure 8G:
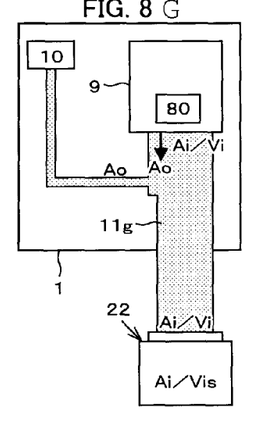
FIG. 8G is a view schematically illustrating another example arrangement of a connection of the liquid crystal module to a motherboard.

In an arrangement of FIG. 8G, an audio/video input signal source (Ai/Vis) is provided in a motherboard 22, and an audio driver 80 is monolithically provided in a liquid crystal panel 9. A vibration source 10 is connected to an FPC 11g which is connected to the liquid crystal panel 9, and a connector of the FPC 11g is connected to the motherboard 22. In the arrangement, an audio input signal Ai and a video input signal Vi are input in the liquid crystal panel 9, and an audio output signal Ao is output from the liquid crystal panel 9 to the vibration source 10.

Figure 8H:
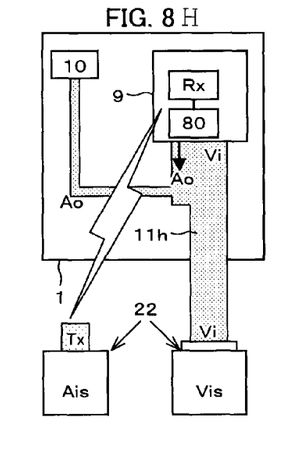
FIG. 8H is a view schematically illustrating another example arrangement of a connection of the liquid crystal module to a motherboard.

In an arrangement of FIG. 8H, an audio input signal source (Ais), a transmitting circuit Tx, and a video input signal source (Vis) are provided in a motherboard 22, and an audio driver 80 and a receiving circuit Rx are monolithically provided in a liquid crystal panel 9. Moreover, a vibration source 10 is connected to an FPC 11h connected to the liquid crystal panel 9, and a connector of the FPC 11h is connected to the motherboard 22 (the video input signal source Vis). In the arrangement, a video input signal Ai is input in the liquid crystal panel 9, and an audio input signal Ai is wirelessly transmitted to the liquid crystal panel 9 via the transmitting circuit Tx and the receiving circuit Rx.

FIGS. 8A through 8H merely exemplify arrangements of a connection of a motherboard to a liquid crystal module, and other arrangements are also possible. For example, in a case where an audio driver 80 is separated into several parts and provided in a liquid crystal module, an arrangement can be such that placements and connection methods illustrated in FIGS. 8A through 8H are used in appropriate combination.

Figure 9:
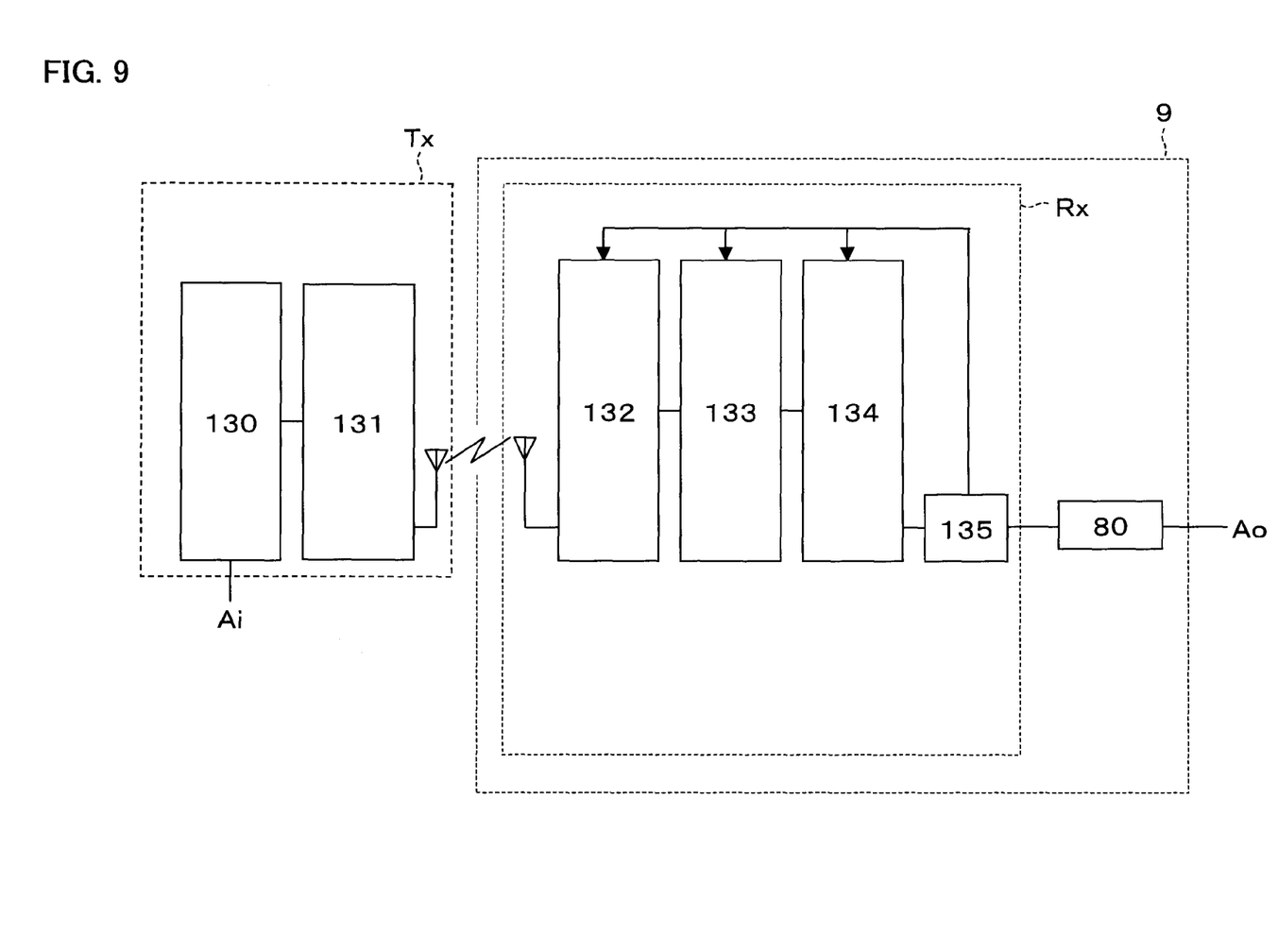
FIG. 9 is a block view specifically illustrating a transmitting and receiving system in the arrangement of FIG. 8H.

FIG. 9 is a view illustrating one example arrangement of a wireless communication by using the transmitting circuit Tx and the receiving circuit Rx of FIG. 8H. As illustrated in FIG. 9, an audio input signal Ai is wirelessly transmitted to the receiving circuit Rx from an antenna via a split circuit 130 and a modulation circuit 131 in the transmitting circuit Tx. The signal received by an antenna in the receiving circuit Rx is detected by a carrier wave detecting circuit which is not illustrated, and is then transmitted to a decode/signal separation circuit 135 via an amplifying circuit 132, a demodulating circuit 133, and a sequencer circuit 134. The decode/signal separation circuit 135 also controls the amplifying circuit 132, the demodulating circuit 133, and the sequencer circuit 134 via a power control circuit (not illustrated). The signal output from the decode/signal separation circuit 135 is input in the audio driver 80 (see FIG. 6), and here, an audio output signal Ao is generated.

In FIGS. 8G and 8H, the audio driver 80 and the Rx can be formed in a manufacturing process of the liquid crystal panel 9. This allows manufacturing processes of the liquid crystal module 1 to be shortened, and its manufacturing cost to be reduced.

The present preferred embodiment describes an arrangement of a liquid crystal module, which is suitable for the cover panel 2 to have an audio function. However, it is naturally possible to add functions other than the audio function, such as a viewing angle control function, to the cover panel, which defines a protection plate of the liquid crystal panel and, which is integrated with the liquid crystal module.

In the liquid crystal module 1, a protection plate or cover panel having a protection function for a surface of a liquid crystal panel is integrated as a module. As a result, the liquid crystal module 1 can be expressed as an audio function-equipped liquid crystal module in which the protection plate has the audio function.

The liquid crystal module according to preferred embodiments of the present invention is preferably applicable to, particularly, a mobile information processing device such as a mobile phone, or a PDA.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid crystal module comprising:
   liquid crystal display members including a liquid crystal panel;
   a protection plate having a protection function and being arranged to protect a surface of the liquid crystal panel;
   a vibrating element arranged to vibrate the protection plate; and
   a module case; wherein
   the liquid crystal display members and the vibrating element are arranged to be contained within the module case, the module case including an opening which is covered by the protection plate, such that the liquid crystal module is attachable and electrically connectible to a mother device.

2. The liquid crystal module as set forth in claim 1, wherein the module case defines an enclosure box.

3. The liquid crystal module as set forth in claim 1, wherein the vibrating element is provided in the protection plate.

4. The liquid crystal module as set forth in claim 1, wherein an air layer is provided between the protection plate and the liquid crystal.

5. The liquid crystal module as set forth in claim 4, wherein a hole is arranged to connect the air layer to a space defined in the module case.

6. The liquid crystal module as set forth in claim 1, wherein the protection plate includes a portion to be cut out in its edge section so that the protection plate is able to be shaped according to a display window of the mother device.

7. The liquid crystal module as set forth in claim 1, wherein the liquid crystal module is capable of being provided with an attachment member arranged to attach the liquid crystal module to the mother device.

8. The liquid crystal module as set forth in claim 7, wherein the attachment member is attachable to an edge section of the protection plate or the module case.

9. The liquid crystal module as set forth in claim 1, wherein the liquid crystal module is mountable to the mother device by an edge of the protection plate or an additional attachment member, wherein the liquid crystal module is mountable to the mother device such that the module case does not come into contact with the mother device.

10. The liquid crystal module as set forth in claim 1, further comprising a wire bundle arranged to be connected to an external component and being extended externally, wherein the wire bundle will be connected to a substrate provided in the mother device when the liquid crystal module is attached to the mother device.

11. The liquid crystal module as set forth in claim 10, wherein an audio signal and a display signal from the mother device are input via the wire bundle.

12. The liquid crystal module as set forth in claim 1, wherein the liquid crystal module is arranged to receive an audio signal wirelessly transmitted from the mother device.

13. The liquid crystal module as set forth in claim 12, wherein an audio signal and a display signal are input via one wire bundle.

14. The liquid crystal module as set forth in claim 13, wherein the one wire bundle includes a power supply wiring.

15. The liquid crystal module as set forth in claim 11, wherein the wire bundle is provided in a flexible print circuit.

16. The liquid crystal module as set forth in claim 11, wherein the input audio signal is relayed via the liquid crystal panel.

17. The liquid crystal module as set forth in claim 16, wherein the audio signal relayed via the liquid crystal panel is transmitted to the vibrating element directly or via the wire bundle.

18. The liquid crystal module as set forth in claim 11, further comprising an audio signal processing circuit arranged to process an audio signal input from the mother device.

19. The liquid crystal module as set forth in claim 18, wherein the wire bundle is provided in a flexible print circuit, and the audio signal processing circuit is provided in the flexible print circuit.

20. The liquid crystal module as set forth in claim 18, wherein the audio signal processing circuit is provided in the liquid crystal panel.

21. The liquid crystal module as set forth in claim 18, wherein the audio signal processing circuit is designed according to an acoustic characteristic of the module.

22. The liquid crystal module as set forth in claim 18, wherein the audio signal processing circuit includes an audio tone control circuit.

23. The liquid crystal module as set forth in claim 18, wherein the audio signal processing circuit includes an audio volume control circuit.

24. The liquid crystal module as set forth in claim 18, wherein at least a portion of the audio signal processing circuit is formed in a liquid crystal panel manufacturing process.

25. The liquid crystal module as set forth in claim 12, wherein at least a portion of a receiving circuit arranged to receive an audio signal which is wirelessly transmitted is formed in a liquid crystal panel manufacturing process.

26. The audio function-equipped liquid crystal module as set forth in claim 1, wherein the liquid crystal module is mountable to the mother device in such a manner that the module case does not come into contact with the mother device.

27. A mobile communication device comprising a liquid crystal module as set forth in claim 1.

28. A mobile information processing device comprising a liquid crystal module as set forth in claim 1.

* * * * *